(12) United States Patent
Miller et al.

(10) Patent No.: US 6,248,382 B1
(45) Date of Patent: Jun. 19, 2001

(54) PROCESS FOR REDUCING THE PATULIN CONCENTRATION IN FRUIT JUICES

(75) Inventors: Chris J. Miller; Rex M. Lyndon, both of Auckland (NZ)

(73) Assignee: Bucher-Alimentech Ltd., Auckland (NZ)

( * ) Notice: Subject to any disclaimer, the term of this patent is extended or adjusted under 35 U.S.C. 154(b) by 0 days.

(21) Appl. No.: 09/381,245

(22) PCT Filed: Mar. 27, 1998

(86) PCT No.: PCT/IB98/00458

§ 371 Date: Sep. 17, 1999

§ 102(e) Date: Sep. 17, 1999

(87) PCT Pub. No.: WO98/43500

PCT Pub. Date: Oct. 8, 1998

(30) Foreign Application Priority Data

Apr. 3, 1997 (CH) ........................... 764/97
Mar. 3, 1998 (NZ) ........................... 329898

(51) Int. Cl.$^7$ ................. A23L 2/78; C02F 1/42
(52) U.S. Cl. ............ 426/271; 426/599; 426/616; 426/615; 426/422; 426/424; 210/660; 210/670; 210/673; 210/692; 210/269
(58) Field of Search .................. 210/660, 670, 210/673, 677, 691, 692, 269, 275, 142; 426/271, 590, 599, 616, 615, 422, 424

(56) References Cited

U.S. PATENT DOCUMENTS

| | | | |
|---|---|---|---|
| 2,667,417 | * | 1/1954 | Delmousee et al. . |
| 2,682,468 | * | 6/1954 | Frampton . |
| 2,928,744 | * | 3/1960 | Ponting . |
| 3,437,491 | * | 4/1969 | Peterson et al. . |
| 3,531,401 | * | 9/1970 | Crits . |
| 3,729,457 | * | 4/1973 | Davankov et al. . |
| 4,439,458 | | 3/1984 | Puri ................... 436/330 |
| 4,514,427 | * | 4/1985 | Mitchell et al. . |
| 4,522,836 | * | 6/1985 | Dechow et al. . |
| 4,871,397 | * | 10/1989 | Stevens . |
| 4,950,332 | * | 8/1990 | Stringfield et al. . |
| 4,965,083 | * | 10/1990 | Norman et al. . |
| 4,971,811 | * | 11/1990 | Strobel et al. . |
| 4,971,813 | * | 11/1990 | Strobel et al. . |
| 5,106,638 | * | 4/1992 | Siegers . |
| 5,178,832 | * | 1/1993 | Phillips et al. . |
| 5,416,124 | * | 5/1995 | Stringfield . |
| 5,460,725 | * | 10/1995 | Stringfield . |
| 5,858,433 | * | 1/1999 | Deguchi et al. . |
| 5,885,638 | * | 3/1999 | Takayanagi et al. . |

FOREIGN PATENT DOCUMENTS 1 420 737   10/1968   (DE) .
0 334 641    9/1989   (EP) .

* cited by examiner

Primary Examiner—Cynthia L. Nessler
(74) Attorney, Agent, or Firm—Burns, Doane, Swecker and Mathis, L.L.P.

(57) ABSTRACT

A procedure for reducing the patulin content in a fruit juice which includes presenting the juice to a resin material having in abundance micropores of less than 20 Å minimum pore width and at least a pore surface capable of retaining patulin by the forces of chemisorption. Preferably the resin has weak base functionality and is substantially devoid of mesopores and macropores. The resin preferably has a surface area of greater than 900 m$^2$/g (BET) and the resin has been hypercross-linked whilst in the swollen state. Regeneration involves the conversion of the resin held patulin to a more easily flushed out derivative using ammonia or a volatile base, preferably generated in situ from a high pH solution.

29 Claims, 13 Drawing Sheets

GRAPH 12:

PROCESS FOR REDUCING THE PATULIN CONCENTRATION IN FRUIT JUICES

The invention concerns a process for reducing the patulin concentration in fruit juices, apparatus suitable for such a purpose and to related methods and means.

Patulin 4-Hydroxy-4H-furo[3,2-c]pyran-2(6H)-one (See Formula 1) is a mycotoxin produced by certain species of the genera Aspegillus and Penicillium. It is common in fruit that is rotting prior to processing for juice production. *Penicillium expansum*, is one such fungus and it is responsible for decomposition of apples and other fruit.

Apples destined for processing into juice production frequently are pack house rejects, wind falls, weather damaged or from cold storage. The fruit is often stored in the open for extended periods before processing. The percentage of fruit with varying degrees of rot can be high and inevitably will contain patulin.

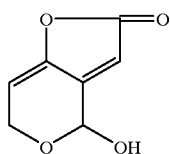

Formula I

The United Kingdom Ministry of Agriculture, Fisheries and Food in its Food Surveillance Paper No. 36 (1993) "Mycotoxins "Third Report" indicates that *Penicillium expansum* which produces patulin is a common storage rot in a diverse range of product(e.g. apples, peaches, pears, bananas, pineapples, apricots, cherries and grapes). They indicate that for apple juices patulin levels are generally higher in cloudy juices than in clear juices (highest levels in their data showed as 434 μg/kg and 118 μg/kg respectively).

Mycotoxins are undesirable in food because of their toxicity to animals and potential toxicity to human beings. The toxic activity of patulin, its teratogenicity, carcinogenicity and mutagenicity is known and is of concern.

The Codex Alimentarius Commission as part of the United Nations joint FAO/WHO Food Standards Programme in their 28th Session (June 1997) in respect of patulin indicates a PMTDI (Provisional Maximum Tolerable Intake) of 0.4 micrograms per kilogram body weight per day (i.e. 0.4 μg/kg.bw/day).

Apple juice can occasionally be heavily contaminated) notwithstanding that apple juice generally (particularly single strength apple juice eg; 11.5° Brix) has patulin levels of below 50 μg/l (micrograms per liter).

We believe that lower recommendations (eg; to below 25 μg/kg of patulin) are now being considered.

We have found in some apple juice samples (where there is a significant use of windfall and/or rotting fruit) to be as high as 1500 μg/l. However apple juice more commonly contains patulin up to 200 μg/l. Nevertheless a significant task exists in meeting targets for patulin content.

Different active and passive processes for reducing the patulin level to below the arbitrary limits mentioned are known. It is known that adding ascorbic acid or sulfur dioxide destroys patulin. However the addition of sulfur dioxide is legally not allowed in commercial operations.

Patulin also degrades in time in stored juice. The gradual loss of patulin from juice on storage is not a practical solution to providing juice with acceptable patulin levels.

Alcoholic fermentation of fruit juice is also reported to destroy patulin.

Some grades of activated carbon are effective at adsorbing patulin from juice. Dosages in the range 1~2 g/l provide up to 80% patulin reduction. Activated carbon can be used commercially to reduce patulin from fruit juice, but it is difficult to handle and is an expensive consumable item. Activated carbon is not viable to regenerate and reuse. It also adds to the solids loading of the factory effluent creating environmental problems.

It is an object of the present invention to provide a commercially viable process and/or apparatus for reducing the patulin concentration in fruit juices. It also involves providing (e.g. regeneration procedures and the products of any such processes or procedures) related procedures, methods and means.

In a first aspect the present invention consists in a process for reducing the patulin content in a fruit juice which comprises or includes (i) presenting the juice to a resin material having in abundance micropores of less than 20 Å minimum pore width ("mpw") and at least a pore surface capable of retaining patulin by the forces of chemisorption (for example, van der Waal and London dispersion interactions), and (ii) harvesting the juice with a reduced patulin content from step (i).

The adsorption of patulin onto the surface of the micropores of the resin is dependent upon the plurality of the surface matrix and orientation of the polar groups on the patulin molecule. The forces of chemisorption are likely provided by van der Waal and London dispersion interactions. The energy of chemisorption is very small and the patulin molecules are able to undergo lateral diffusion and conformational changes on surrounding surfaces. Therefore the chemisorption is best described as the physical attraction on to a chemically inert adsorption surface.

Preferably the resin has weak base functionality although non-functionaries yet wettable resins may be used.

Preferably said resin is substantially devoid of mesopores and macropores.

It is believed that the resin and its micropores is such that caustic soda is substantially ineffective in chemically converting the micropore held patulin to a more easily flushed out patulin derivative.

Preferably said process uses a resin having very high internal surface areas yet a low mercury intrusion characteristic.

Preferably said resin has a surface area of greater than 900 (eg; from 900 to 1500) m$^2$/g (BET).

Preferably said surface area is from 1000 to 1500 m$^2$/g (BET).

Preferably said resin has a mercury intrusion ($d_{50}$,A) of less than 100.

Preferably said resin has micropores in abundance of less than 15 Å (mpw).

Preferably said resin is in the form of a bed of fibres, beads or granules.

Preferably said beads granules or fibres have a section of from 300 to 1600 microns across.

Preferably said resin is a styrene divinyl benzene network copolymer resin.

Preferably said resin has been hypercrosslinked whilst in the swollen state.

Preferably said resin has in abundance micropores of minimum pore width of from 5 to 2 Å (mpw).

Preferably the resin has been regenerated after a previous use in a similar patulin extraction process.

Preferably said regeneration has involved the conversion of the resin held patulin to a more easily flushed out derivative using ammonia or a volatile base.

Preferably said conversion has involved the at least substantially in situ generation of ammonia or a volatile base from a high pH solution in contact with the resin.

Preferably said regeneration has subsequently involved after flushing out of the patulin derivative(s) the presentation of an acid to the resin.

Preferably the juice is presented to the resin in the range of 20 or greater bed volumes prior to regeneration of the resin, the bed volume range being expressed in proportion to a real or notional single juice strength.

Preferably the juice is presented to the resin at a rate of from about 4 to about 10 bed volumes/hour.

Preferably the resin has been tertiary amine functionalised but is presented to the juice in an acid form as opposed to the free base form thereby reducing the uptake of juice acid during the presentation of the juice to the resin.

Preferably the resin provides a bed of depth of from 0.5 to 2.0 meters.

In a further aspect the present invention consists in apparatus for use in a process as previously defined, said apparatus having at least one vessel providing a bed of the resin and which is operable in at least two modes, the first mode being that which presents juice to and harvests juice from the resin and the second mode being that which regenerates the resin.

In still a further aspect the present invention consists in a method of regenerating a micropored resin which contains patulin in micropores which comprise or includes, in a high pH liquid environment containing the patalin fouled resin, generating a basic vapour (preferably ammonia) sufficient to convert the micropore held patulin to a more easily flushed out derivative or derivatives and thereafter flushing the derivative(s) from the micropores.

Preferably ammonia is generated.

Preferably the high pH liquid environment is 10 or above.

Preferably the resin after the flushing step is presented to an acid.

In another aspect the present invention consists in, in a patulin reducing process of a fruit juice, the use of a styrene divinyl benzene network co-polymer resin in the form of spherical beads or granules or fibres in sufficient quantities and with a sufficient proportion of micropores with a mpw of less than 20 Å.

In some forms said resin has a weak base functionality.

Preferably said beads or granules or fibres (preferably beads or granules) having a section of between 300–1600 microns across are used.

In a further aspect the present invention consists in a process for reducing the patulin concentration in a fruit juice or fruit juices (hereafter juice) comprising or including the steps of presenting the juice to a styrene-divinyl benzene network co-polymer resin beads or granules (preferably spherical) in sufficient numbers for the volume of juice being present so that it achieves a desired patulin reduction over the contact.

In still a further aspect the present invention consists in a process for reducing the patulin content of a fruit juice which comprises (i) presenting the fruit juice in suitable apparatus to beads or granules or fibres of a styrene-divinyl benzene network co-polymer resin that has been hyper cross linked in the swollen state and has a surface substantially devoid of mesopores and macropores yet has micro pores in abundance, and (ii) harvesting from such apparatus the fruit juice with a reduced patulin content.

Preferably the resin has been functionalised to facilitate wetting prior to its contact with the fruit juice.

Preferably said functionalising has been weak base functionalised.

Preferably said apparatus is apparatus of any of the kinds hereinafter described.

Preferably the resin is regenerated using ammonia or a volatile base.

Preferably the use of ammonia or volatile base follows resin contact with strong alkali.

Preferably said strong alkali is sodium or potassium hydroxide.

Preferably the regeneration involves the provision of an acid rinse following exposure of the resin to ammonia gas or the substitute volatile base.

In a further aspect the present invention consists in apparatus for reducing the patulin concentration in a fruit juice or fruit juices which includes a vessel holding a quantity of styrene-divinyl benzene network co-polymer resin beads or granules in a manner such that a through-put of juice can be presented to the resin thereof and which allows between process runs of juice through the vessel the flushing of the resin with regenerative liquid(s) and/or gas(es).

In still a further aspect the present invention consists in a process for reducing patulin concentration in a fruit juice which comprises presenting the juice to beads or granules of a styrene-divinyl benzene network co-polymer resin having micropores of less than 20 Å mpw.

Preferably said beads, granules or fibres have a section of from 300–1600 microns across.

Preferably said beads or granules or fibres are substantially devoid of mesopores and macropores.

In still a further aspect the present invention consists in a process for reducing patulin concentration in a fruit juice which comprises or includes presenting the juice to beads or granules of a styrene-divinyl benzene network co-polymer resin having pores which are almost exclusively micropores of less than 20 Å mpw (ie; is low or substantially devoid of mesopores and macropores).

Preferably said beads, granules or fibres have a section of from 300 to 1600 microns.

Preferably said resin has a low mercury intrusion (e.g. <100).

Preferably said resin has been hypercrosslinked whilst in the swollen state.

Whilst reference is made herein to the process vessel being prepared for the extraction of patulin nothing herein precludes the option of admixing with the resin beads (or granules or fibres) (or layering in conjunction therewith or separate therefrom or using upstream or downstream thereof) other ion exchange media the function of which may differ from, be ancillary to, or otherwise act in a way different from that of the preferred resins of the present invention.

As used herein in respect of the pore size the terms micropore, mesopore and macropore have the following IUPAC meanings:

"micropore"—pores with a m.p.w. in the range of less than 20 Å.

"mesopores"—pores with a m.p.w. in the range of 20 to 500 Å.

"macropores"—pores with a m.p.w. in the range of greater than 500 Å.

As used herein the terminology "BV" or "bv" refers to bed volumes (i.e. the volume equal to the volume of resin contained in the processing vessel).

As used herein the term "juice" includes within its ambit optionally pretreated fruit juices (eg; concentrated, ultrafiltrated, etc.) and/or blended and/or diluted fruit juices.

As used herein the terms beads or granules or fibres whilst described in the disjunctive do not rule out a mix thereof.

BRIEF DESCRIPTION OF THE DRAWINGS

Preferred forms performing the present invention will now be described with reference to the accompanying drawings in which.

The present invention in its preferred form can commercially reduce patulin in fruit juice and concentrates made from fruit juice using equipment and engineering techniques used in existing applications of adsorbent polymers and ionic exchange resins in the food industry. See for example the machinery referred to by R Lyndon in the previously mentioned reference.

The present invention in its preferred forms provides an economically viable method for reducing patulin by typically in the order of 90% from clarified apple juice with a synthetic adsorbent resin having clearly defined characteristics. Contained in a suitably designed and engineered system, the synthetic adsorbent resin can be repeatedly cycled between adsorbing patulin and rejuvenated by a unique regeneration process.

Whilst the primary application is patulin reduction in apple juice there is no reason to expect that patulin will not be reduced from other fruit juices (e.g. peaches, pears, bananas, pineapples, apricots, cherries and grapes) with the described process.

Also of importance, the preferred synthetic adsorbent resins will preferably not remove colour from the apple juice to be processed. This is an important consideration, as colour reduction is often not required by juice processors. However if colour reduction of juice is required it can or may be achieved by inclusion of a suitable adsorbent into the processing vessels in addition to the patulin reducing resin.

Figure 1:
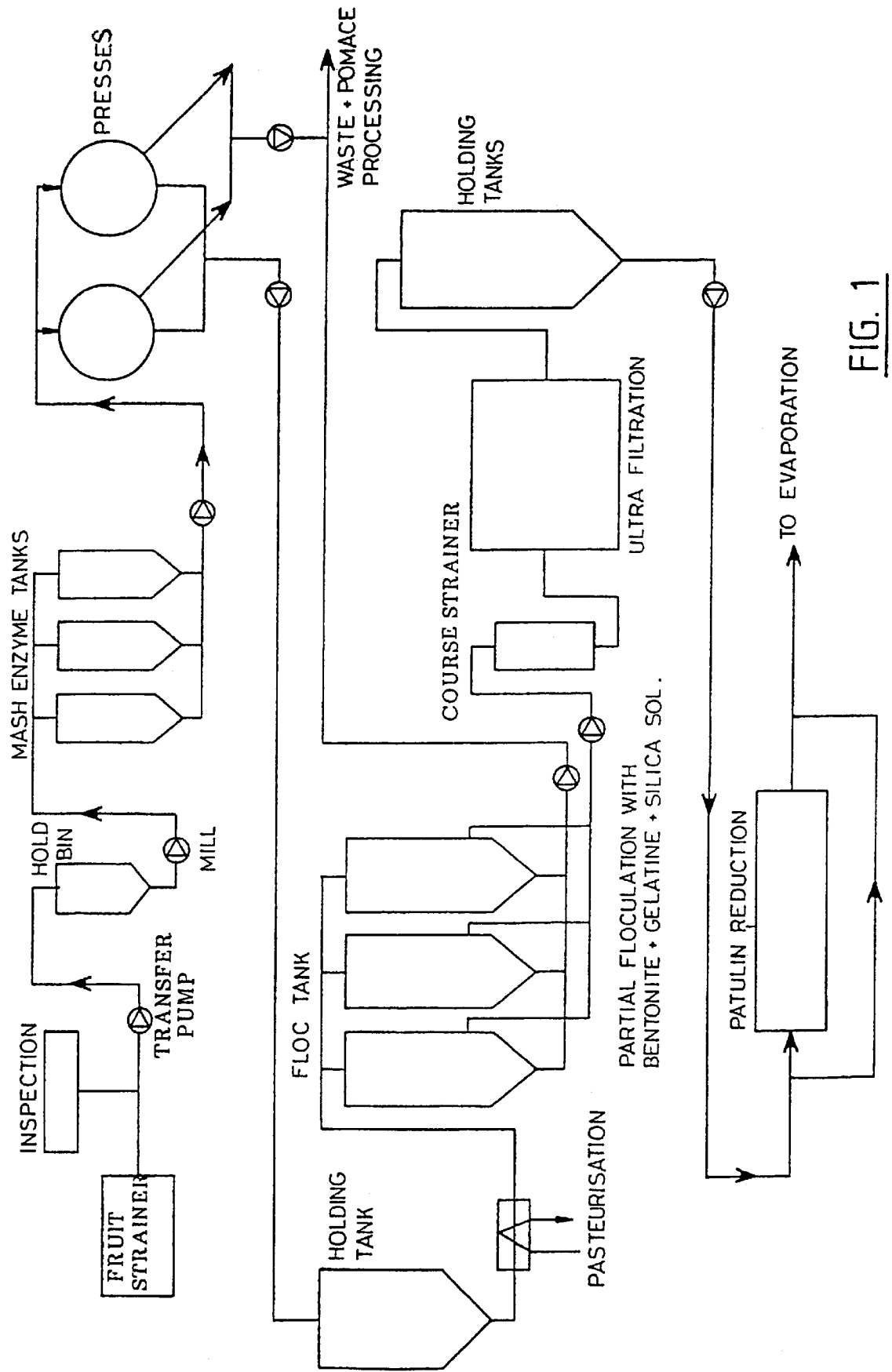
FIG. 1 is a flow diagram of a conventional process for manufacturing apple juice save for the fact that it includes preferably after a preferred ultra filtration or other filtration (eg; diatomaceous earth) stage, a system for reducing patulin levels prior to the concentration of the juice.
Figure 2:
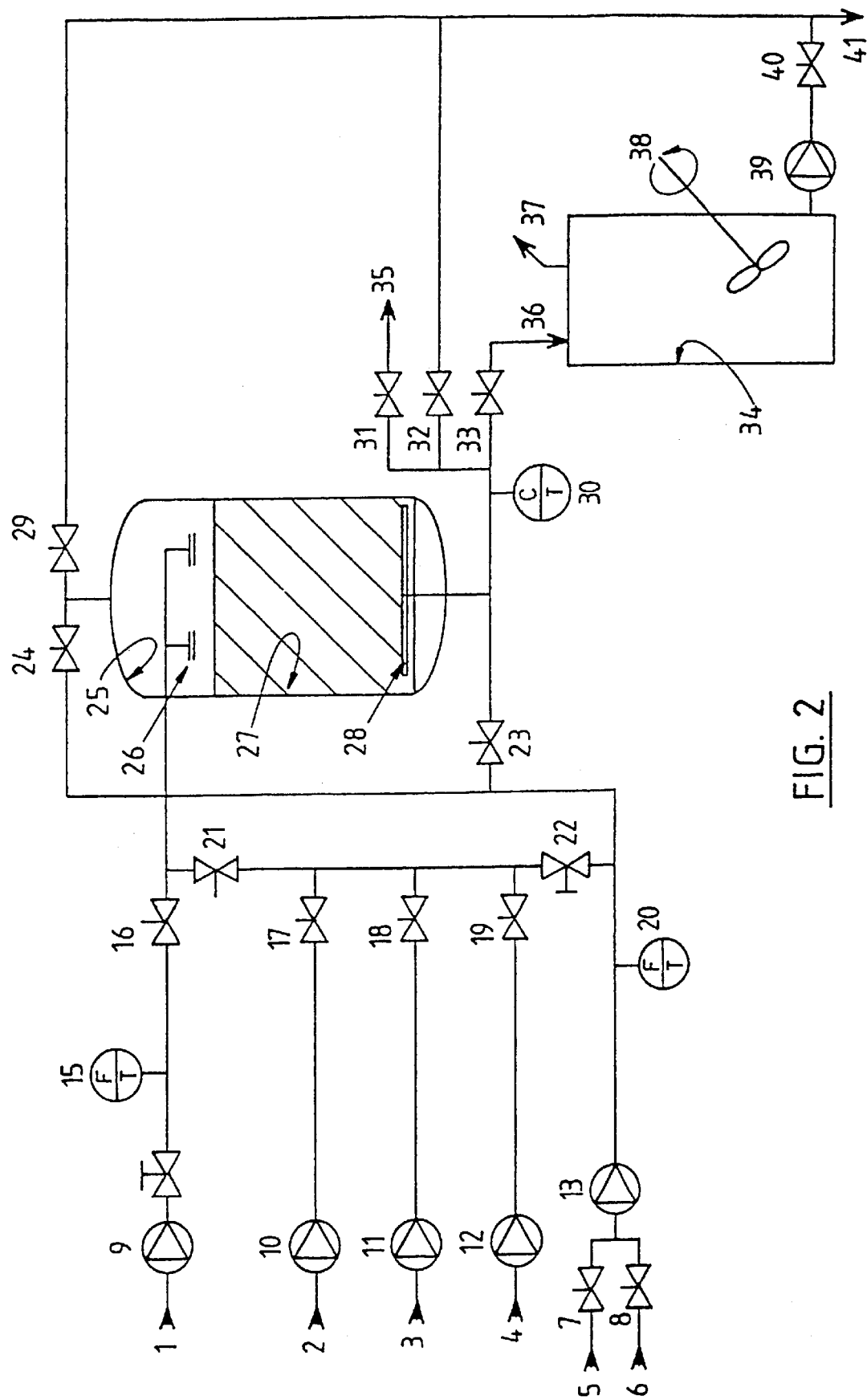
FIG. 2 is a diagram of preferred apparatus in accordance with the present invention.
Figure 3:
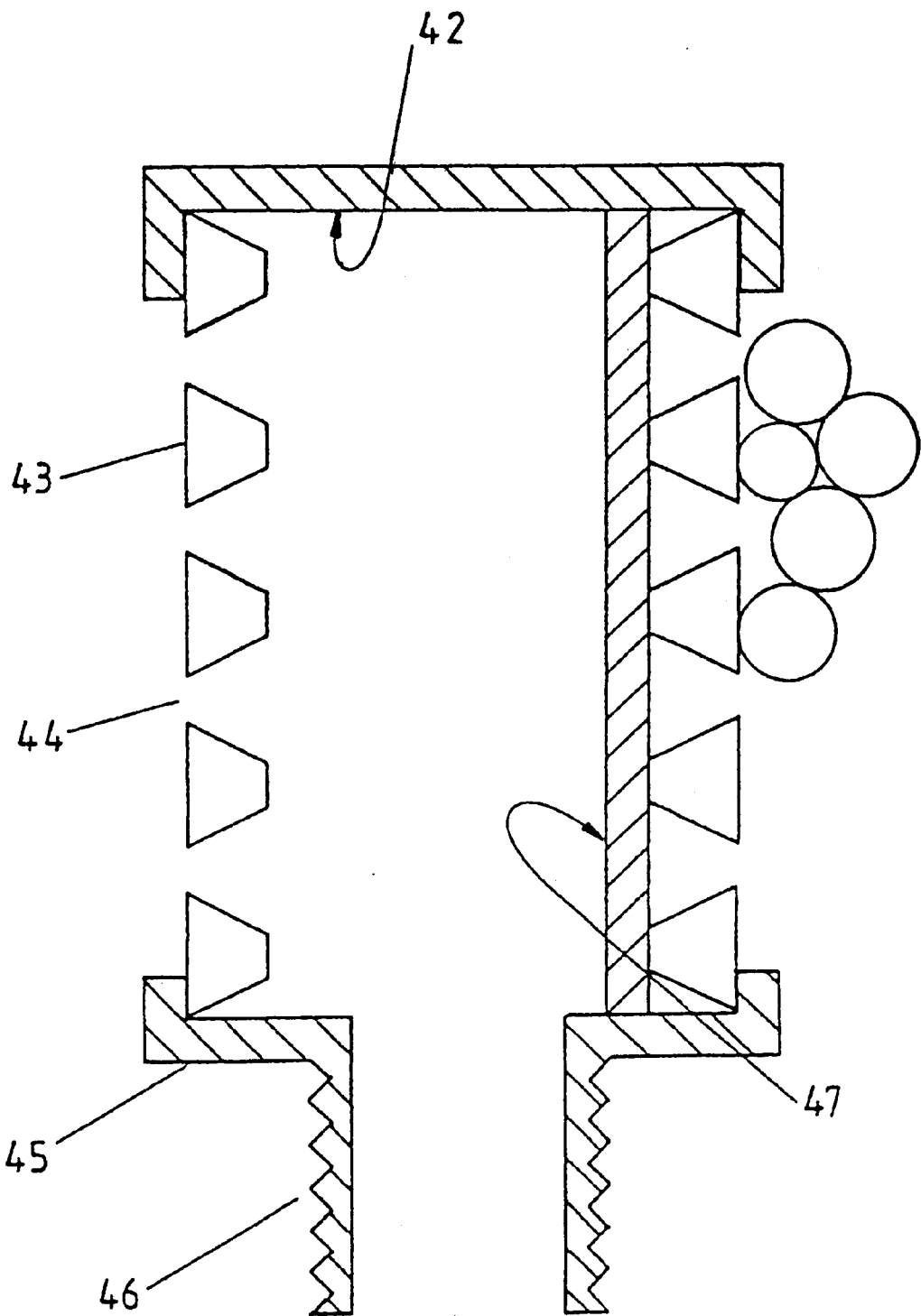
FIG. 3 shows in longitudinal cross section a typical underbed strainer (eg; ofthe kind indicated in FIG. 2 as 28), such a strainer forming part of conventional type apparatus (such as discussed in "Commercialisation of Absorber Technology in the Fruit Juice Industry", Fruit Processing 4-96, R Lyndon, the full content of which are hereby here included by way of reference)
Figure 4:
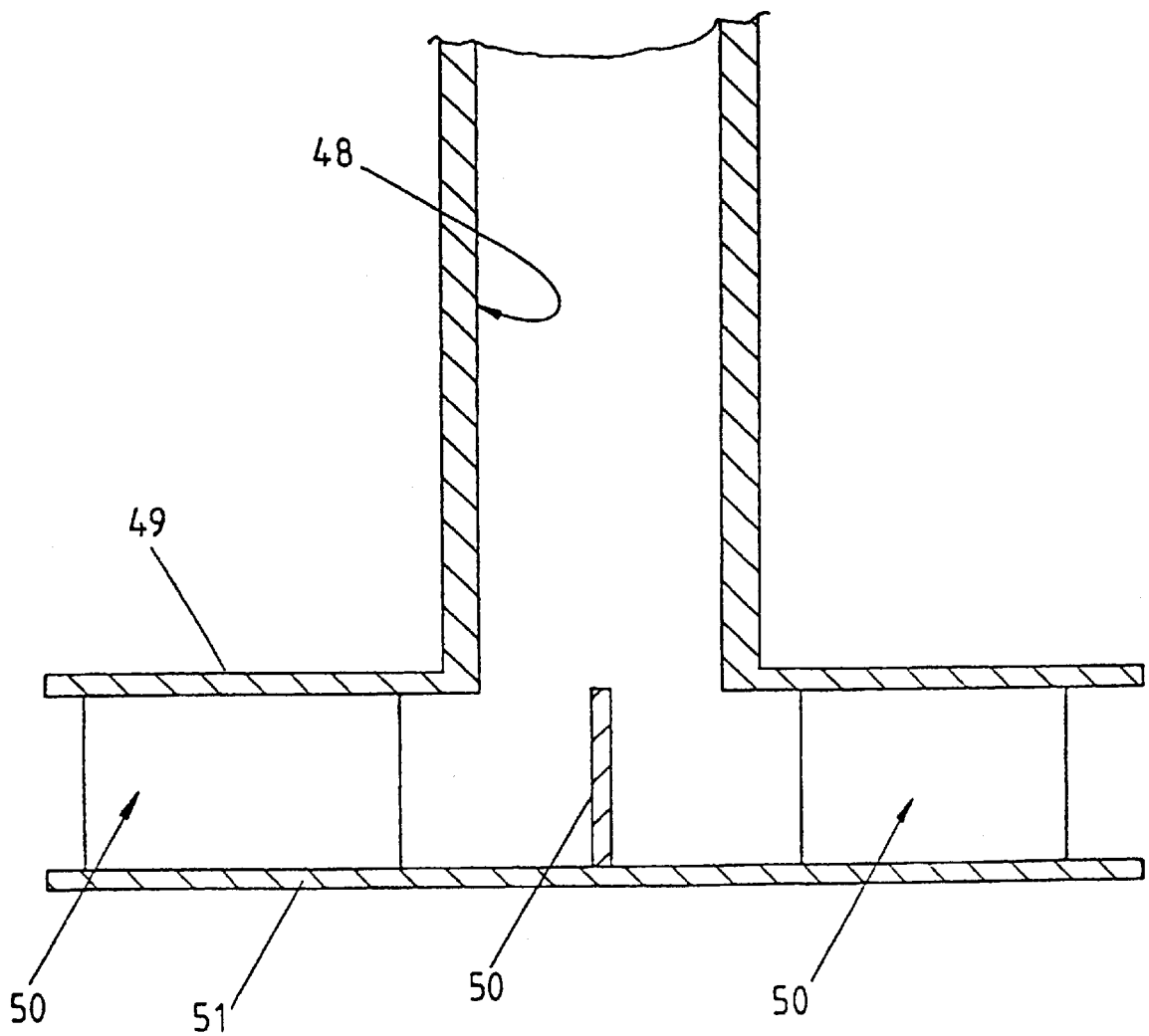
FIG. 4 is a juice and regenerant inlet distributor (referred to as 26 in FIG. 2)

The apparatus depicted hereinafter in FIGS. 2, 3 and 4 are described as follows:

(A) FIG. 2
1. Clear Fruit juice inlet.
2. Alkali inlet (concentrated sodium or potassium hydroxide) for dilution to 1% w/v and 2% w/v with dilution water.
3. Ammonia inlet (commercial ammonia solution diluted to 0.5% w/v with dilution water).
4. Dilute Citric acid inlet or Phosphoric Acid inlet.
5. Raw water inlet (Potable factory water).
6. Soft water inlet (water free from hardness salts so that hardness precipitation does not occur when diluting caustic soda).
7. Raw water isolation valve.
8. Soft water isolation valve.
9. Fruit juice feed pump.
10. Alkali injection Pump.
11. Ammonia injection pump.
12. Acid injection pump.
13. Water pump.
14. Fruit juice flow control valve.
15. Fruit juice flow Meter/Transmitter.
16. Fruit juice inlet isolation valve.
17. Alkali injection/isolation valve.
18. Ammonia injection/isolation valve.
19. Acid injection/isolation valve.
20. Water flow Meter/Transmitter.
21. Regenerant injection isolation valve.
22. Regenerant dilution water isolation valve.
23. Up Flow water control and isolation valve.

24. Sweeten off/Rinse valve.
25. Adsorbent resin containment/Process vessel.
26. Process vessel inlet distributors
27. Bed of adsorbent resin.
28. Under-bed strainers/Distributors. Fruit juice and regenerant collectors.
29. Up flow outlet valve.
30. Conductivity Meter/Transmitter.
31. Treated juice outlet valve.
32. Regenerant and rinse outlet to drain valve.
33. Regenerant outlet to effluent tank valve.
34. Effluent tank.
35. Treated juice outlet.
36. Inlet to effluent tank.
37. Vent to atmosphere.
38. Mixer.
39. Effluent discharge pump.
40. Effluent outlet valve.
41. Outlet to drain/Effluent Discharge.
(B) FIG. 3—an under bed strainer to retain resin within the process vessel (such strainers being arrayed at the bottom of the vessel to provide containment of the resin and even distribution and collection of the treated juice and the regenerants
42. Stainless steep cap.
43. Wedge profile wire, helically wound and welded to longitudinal tie wires.
44. Stainer "gap"—typically 200–300 micron.
45. Bottom cap.
46. Threaded nipple for fitting into common mainfold.
47. Longitudinal tie wire.
(C) FIG. 4 (Detail of inlet juice and regenerant distributors within the process vessel) the distributors being arranged to provide even distribution of juice and regenerant onto the top of the adsorbent resin bed.
48. Inlet pipe.
49. Distributor top disk.
50. Spacer.
51. Distributor bottom disk.

The Adsorbent Polymer.

Screening trials were conducted to determine the most effective adsorbents for patulin with apple juice containing approximately 200 μg/l of patulin. These were conducted by contacting 150 ml of apple juice with 10 ml of trial adsorbent resin at ambient temperature for 3 hours. Throughout the contact period the containment flask was shaken with a laboratory shaker. At the completion of the contact time the contacted juice was analysed for patulin using an established method.

We have noted that patulin is adsorbed by resins that have a high percentages of mesopores and macropores, but the capacity to retain patulin is limited, presumably, because other hydrophobic chemical species which are not size excluded from the pores are preferentially adsorbed and displace patulin. The overall capacity of these resins to economically adsorb and retain patulin is therefore limited.

The most effective adsorbents were those with a high surface area characterised by a high percentage of micropores.

The most preferred resins tested were those high in micropores and correspondingly very low in mesopores and macropores.

The most preferred resins are the P570 and P700 Alimentech resins of ourselves. The latter with its greater mercury intrusion characteristic than that of Alimentech P570 has more affect on colour of apple juice. Other resins are those of Purolite International Limited referred to below.

All such resins are capable of being manufactured using the Davankov—Tsyrupa technology. See in this respect for example U.S. Pat. No. 3,729,457, V. A. Davankov and M. P. Tsyrupa, Reactive Polymers, 13 (1990), 27–42, and M. P. Tsyrupa et al, Reactive Polymers, 19 (1993) 55–66.

They can perhaps best be characterised by their method of synthesis i.e. that cross-linking occurs whilst the polymer is in a swollen state.

Table 2 collects some relevant static characteristics of some resins of this kind available from Purolite International Ltd or ourselves.

TABLE 2

| Characteristics | Purolite MN-100 | Purolite MN-200 | Alimentech P570 | Alimentech P700 | Purolite MN-400 | Purolite MN-500 | Purolite MN-150 |
| --- | --- | --- | --- | --- | --- | --- | --- |
| Surface area, $m^2/g$ (BET) | 900–1100 | 900–1100 | 1000–1500 | 900–1100 | 900–1100 | 900–1100 | 900–1200 |
| $d_{50}$, Å (Hg intrusion) | 850–950 | 850–950 | <100 | 850–950 | 850–950 | 850–950 | 300–400 |
| Pore volume, ml/g (dry) | 1–1.1 | 1–1.1 | micropores 0.5 mesopores <0.1 macropores <0.1 | 1–1.1 | 1–1.1 | 1–1.1 | 0.6–0.8 |
| Functionality | WBA | — | WBA | WBA | SBA | SAC | WBA |
| Volume capacity, eq/l | 0.1–0.2 | — | 0.2–0.4 | 0.2–0.4 | 0.2–0.4 | 0.8–1.0 | 0.1–0.3 |
| Moisture, % | 58–61 | — | 42 | 58–61 | 58–61 | 53–56 | 52–55 |
| Strong base capacity, | 10–20 | — | 10—20 | 10–20 | >95 | — | 10–20 |
| Expansion, % (ionic forms) | <5 | — | <5 | <5 | <5 | <5 | <5 |

Three porosity classes have been selected for this broad, first series of resins: (i) Alimentech P570, (ii) Purolite MN-150, and (iii) the group Purolite MN-100, MN-200, MN-400 and MN-500 and Alimentech P700. It should be remembered that BET and mercury intrusion porosimetries are carried out on dried shrunken materials, so the recorded values are real, and reproducible, but at best proximate.

The chosen functionalities are those historically selected in ion-exchange applications:
1. SBA—strong base anion, quaternary ammonium.
2. WBA—weak base anion, tertiary amine.
3. SAC—strong acid cation, sulfonic acid.

Two most preferred adsorbent resins to effectively adsorb and retain patulin from the apple juice are Alimentech P570 and Alimentech P700 available from us.

These are both styrene—divinyl benzene network copolymers with Davankov—Tsyrupa type "hyper crosslinking".

Alimentech P570 is a very highly cross linked polystyrenic network produced by hypercrosslinking in the swollen state (small low pore diameters (<100 $d_{50}$ A)). This resin is characterised by having very few mesopores and macropores and a very high percentage of micropores (minimum pore width <20 Angstroms).

These preferred adsorbent resins were transferred to laboratory columns, which are scaled down from full size process vessels. Process trials with the two polymers show that patulin could be removed from apple juice solution at economic cycle lengths of at least 30 bed volumes.

Figure 5:
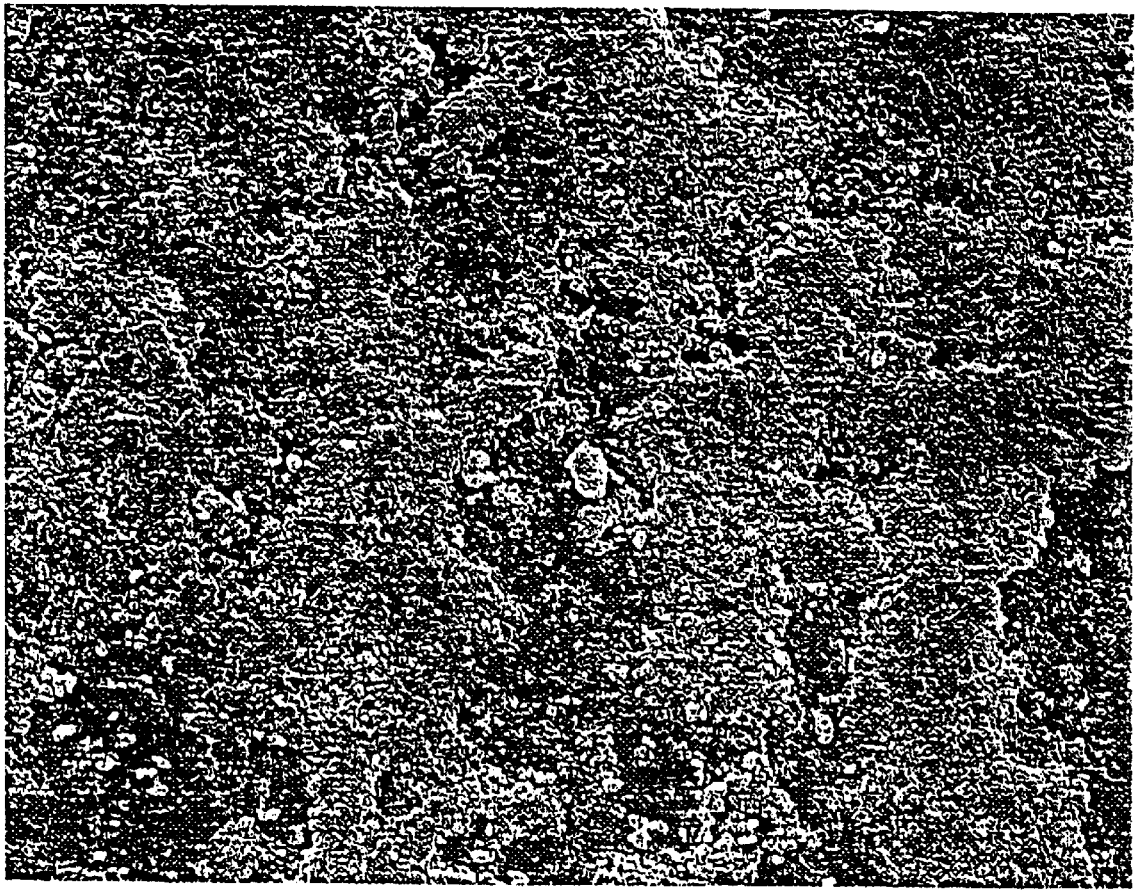
FIG. 5 is a photograph (2500× magnification) of the preferred resin (Alimentech P570) of the present invention showing the surface of the bead.
Figure 6:
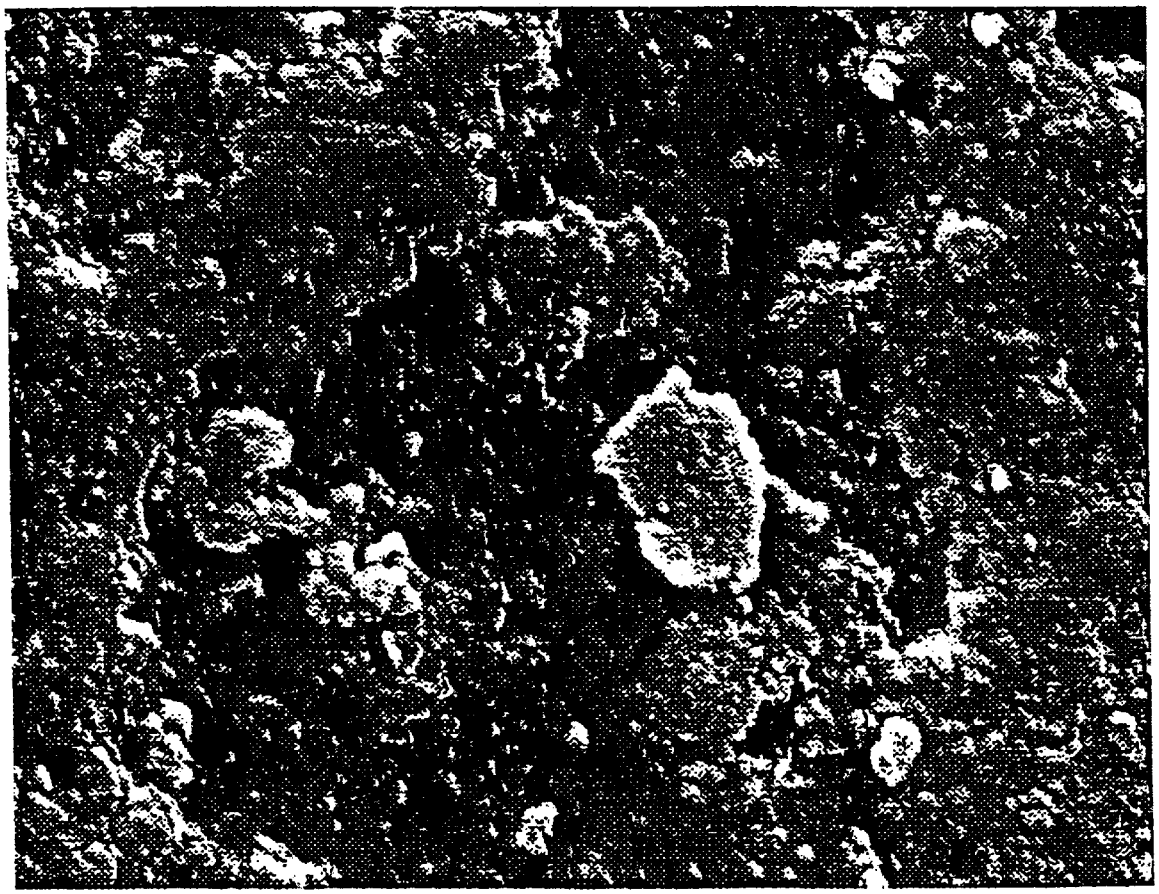
FIG. 6 is a similar photograph to FIG. 5 but showing the surface of the bead magnified by 10,000 times.
Figure 7:
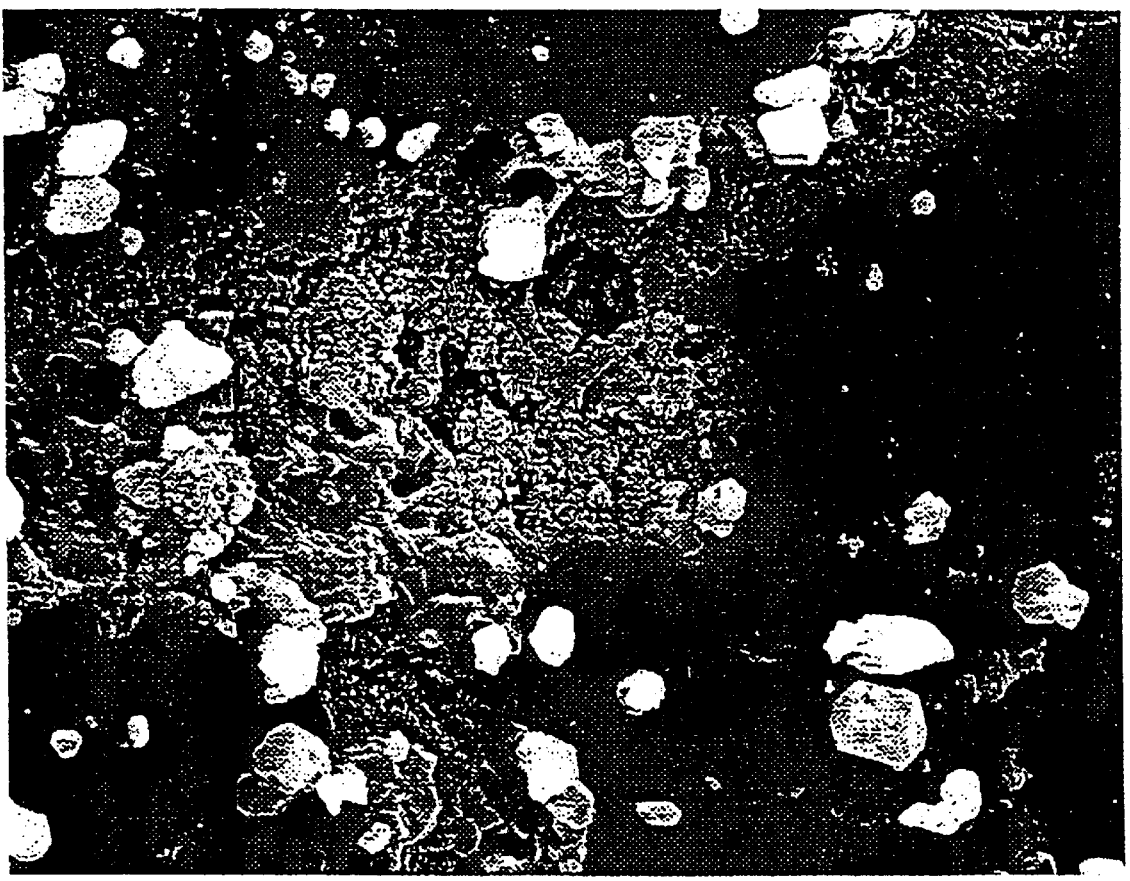
FIG. 7 is a similar photograph to that of FIG. 5 but of a typical styrene-divinyl benzene adsorbent polymer with a high level of mesopores and macropores (the photo being shown at 2500 time magnification)
Figure 8:
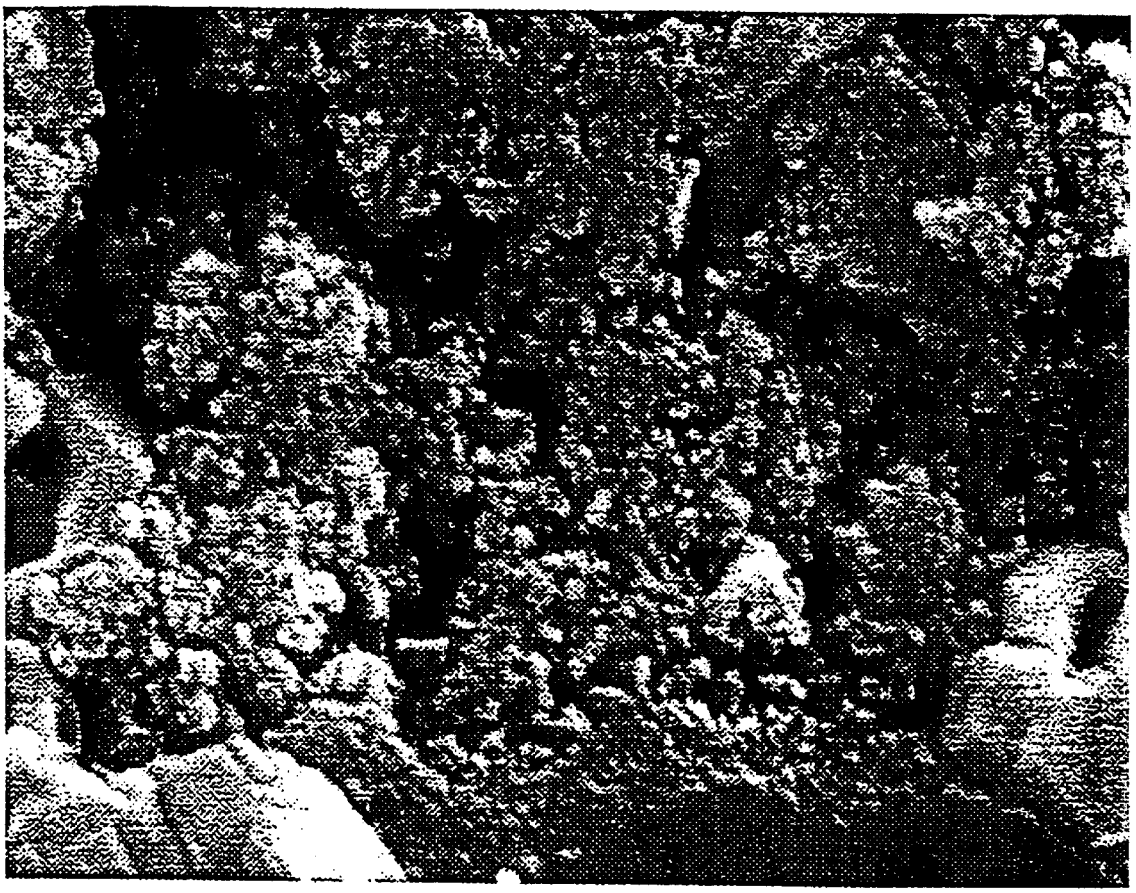
FIG. 8 is a surface of the same bead depicted in FIG. 7 but at 10,000 times magnification, again showing the high level of mesopores and macropores in a typical styrene-divinyl benzene adsorbent polymer (for example as disclosed in U.S. Pat. No. 4,297,220 of Rohm and Hass Company and U.S. Pat. No. 4,439,458 of the Coca-Cola Company hereby both introduced by way of reference)

Of particular importance is the fact that Alimentech P570 has virtually no mesopores or macropores. See FIGS. 5 and 6 and contrast them with FIGS. 7 and 8. The absence of these larger pores means that colour bodies in the juice are not adsorbed. Therefore the colour of the juice is not reduced when contacted with the adsorbent resin. Trial results show colour is not reduced by more than 1.5% (AU measured at 420 nm). Colour reduction is sometimes a requirement, but most often colour reduction is specifically not required by a processor.

A further advantage of these synthetic adsorbent polymers is that they have a microporous structure. Molecules that would normally displace patulin are size excluded from being adsorbed.

Standard styrene—DVB, polyester and acrylic resins can show a capacity to adsorb patulin but do not have such a "tight" porosity, and therefore have limited capacity. See FIGS. 7 and 8. However other resin types otherwise having the characteristics specified can be used.

Non functionaries synthetic polymers of kind required with an abundance of micropores can sometimes be difficult to wet—amination with a tertiary amine (or any other means of providing a weak base functionality) ensures wetability of the micropores allowing passage of aqueous solution into them.

Alimentech P570 is aminated with tertiary amine to provide the preferred weakly basic capacity. The weak base functionality assists the wetting of the resin.

2. Regeneration:

Conventional adsorbent regeneration with aqueous caustic is not suitable for desorbing patulin because hydration of the hydroxyl ion size excludes it from the micropores of the adsorbent. Organic solvents are not practical based on cost and difficulty in handling and the need to ensure thorough removal from the resin before the resin bed is returned to being contacted with fruit juice.

Patulin is desorbed from the resin at elevated pH. It was necessary to use a base that would migrate into the micropores of the resin. Trials were conducted with the use of ammonium hydroxide as a volatile base. This has proven to be very successful and unique.

We believe our use of ammonia gas, produced in situ by mixing dilute ammonia solution with dilute caustic soda or caustic potash just prior to entering the resin containment vessel and allowing the ammonia to diffuse into the micropores of the resin, is a new method of regeneration. The success of this regeneration procedure is demonstrated in the data presented hereafter. Nevertheless any other patulin degrading volatile base may be used.

Practical Application:

The process of reducing patulin from clarified fruit juice may be engineered to provide a commercial process. Practical plant may be constructed using conventional engineering techniques used in the application of ion exchange and other adsorbent polymers used in the water and food processing industries.

Equipment may be constructed from stainless steel and designed to process at any flow rate encountered in practice. Typical flow rates will be 2,000 liters per hour to 30,000 liters per hour.

Either fresh, single strength juice or reconstituted juice from concentrate may be used.

Alimentech P570 (the preferred media) is contained in a suitably sized processing vessel and retained by a system of strainers located in the bottom of the vessel.

By a series of connected pipework and valves, pipes and tanks, the resin contained within the vessel can be contacted with juice during the resin exhaustion or juice process cycle, and various regenerants during the rejuvenation or regeneration cycle.

A single processing vessel provides batch operation with the vessel alternating between juice processing for patulin reduction and regeneration or rejuvenation.

Continuous processing is achieved by using equally sized vessels. One vessel is processing whilst the other is being regenerated. The vessels are sized to contain enough resin so that the processing time for the juice exceeds the regeneration time.

A continuously processing machine may be installed in as part of the juice production facility so that all, part or none of the juice may be passed through the adsorbent resin bed.

Processing Procedure: (Refer to FIGS. 1 to 4 and 13).

The process is completed in a number of steps carried out in a predetermined order. The following steps are required to complete a fill cycle from the commencement of the cycle to the time the cycle is ready to begin again.

Step

Description

1. Sweeten-on:

Water from the previous cycle (final step of the regeneration) is displaced by juice, which is pumped into the vessel from the juice feed supply. The displaced water is diverted to drain or may be recycled to a water reuse system. Juice flow rate 5–10 bed volumes per hour.

Completion of the sweeten-on step may be determined by either the volume of the influent juice or sensing the presence of juice at the outlet of the vessel with a suitable instrument. (conductivity, refractive index, mass flow etc).

Flow description:

Juice into clear juice inlet (1). Juice flow controlled at flow control valve (14). Juice flows into process vessel through valve (16). Juice distributed onto adsorbent resin bed through juice inlet distributors (26). Water displaced from resin bed is collected in the under bed strainer/distributor system (28) and diverted to the drain (41) via Regenerant and rinse outlet to drain valve (32).

Condition to advance:

Volume, conductivity, Brix.

2. Juice Process:

Also known as exhaustion cycle. Juice is processed down flow through the resin bed at a flow rate in the range 5–10 bed volumes per hour. During this cycle patulin is adsorbed into the pores of the resin. The juice process step continues until the capacity of the resin to adsorb patulin is exceeded. This point is established by analysis of the juice for residual patulin, and retrospectively applied to subsequent processing cycles. Once the predetermined juice volume as measured with a suitable volume measuring device the next step begins Flow description:

Juice into clear juice inlet (1). Juice flow controlled at flow control valve (14). Juice flows into process vessel through valve (16). Juice distributed onto adsorbent resin bed through juice inlet distributors (26). Having passed through the adsorbent bed the treated juice is collected by the under bed strainer/distributor system (28) and diverted via Treated juice outlet valve (31) to the treated juice outlet (35).

Condition to advance:
Volume (measured with flow meter (15)).

3. Sweeten Off:

At the completion of the exhaustion step the juice is displaced with water at 5–10 b.v. per hour to ensure that the maximum amount of juice is recovered to the product collection tank. The completion of sweeten off is determined by either the volume of the influent water or sensing the reduced juice concentration at the outlet of the vessel with a suitable instrument (conductivity, refractive index, mass flow etc).

Flow description:

Raw potable water enters via valve (5) and isolation valve (7), is pumped (13) into the top of the resin containment/processing vessel via sweeten off valve (24). Juice contained in the vessel is displaced down-flow through the bed collected in the under bed strainer/distributor system (28) and diverted via valve (31) to the treated juice outlet (35).

4. Backwash:

Water is passed up-flow through the resin bed at a flow rate of about 6 meters/hour. The resin bed is expanded and fluidised to remove any insoluble solids filtered on to the bed or channelling within the bed which may have occurred on the previous process cycle Flow description:

Soft water enters via valve (6) and isolation valve (8), is pumped (13) into the bottom of the resin containment/processing vessel at a preset flow rate via the upflow water control valve (23). The backwash water is distributed up-flow into the resin containment vessel. Water exits the vessel to drain via backwash out let valve (29).

Condition to advance:
Time—10–20 minutes.

5. Settle:

Flow through the bed is stopped, allowing the resin to classify and settle.

Flow description:

All inlets and outlets to the resin containment/process vessel are closed so that there is no flow in or out of the vessel.

Condition to advance:
Time—approximately 5 minutes.

6. Alkali Inject:

Resin bed is contacted, down-flow (or up-flow) with alkali solution. Acceptable performance is obtained using 2 b.v. of 2% w/v solution of either sodium or potassium hydroxide solution, passed down flow through the bed at a flow rate of about 4 b.v. per hour.

Caustic solution raises the pH of the resin to above pH 10 and regenerates the ion exchange sites and converts the tertiary amine groups into the free base form.

Flow description:

Soft water from inlet (6) and isolation valve (8) is pumped (13) via flow control valve (22), and regenerant isolation valve (21) into the resin containment/processing vessel (25), distributed onto the resin bed via the regenerant chemical inlet distributors (26). Concentrated sodium or potassium hydroxide from inlet (2) is pumped (10) via injection valve (17) and "on-line" diluted to 2% w/v. Having passed down-flow through the resin containment/process vessel, the spent solution is collected by the under bed strainer/distributor system (28) and diverted via regenerant rinse outlet valve (33) to the effluent discharge (41).

Condition to advance:
Time—30 minutes.

7. Caustic+Ammonia Injection:

Resin bed is contacted, down flow or up flow with solution of caustic and ammonium hydroxide. 1 b.v. of solution containing 1% w/v sodium or potassium hydroxide and 0.5% w/v ammonium hydroxide is passed through the bed at a suitable flow rate of about 4 b.v. per hour.

Flow description:

Soft water from inlet (6) and isolation valve (8) is pumped (13) via flow control valve (22), and regenerant isolation valve (21) into the resin containment/processing vessel (25), distributed onto the resin bed via the regenerant chemical inlet distributors (26). Concentrated sodium or potassium hydroxide from inlet (2) is pumped (10) via injection valve (17) and "on-line" diluted to 1% w/v. Ammonium hydroxide solution from inlet (3) is pumped (11) via injection valve (18) and "on-line" diluted to 0.5% w/v. Having passed down-flow through the process vessel, the spent solution is collected by the under bed strainer/distributor system (28) and diverted via effluent outlet valve (33) to the effluent tank (34).

Condition to advance:
Time—15 minutes.

8. Caustic+Ammonia Diffusion:

At the completion of the aqueous caustic ammonia solution injection step flow through the vessel is stopped to allow a holding time of approximately 30 minutes enabling diffusion of gaseous ammonia into the matrix of the resin and for patulin to diffuse out from the resin matrix.

Flow description:

All inlets and outlets to the process vessel are closed so that there is no flow in or out of the vessel.

Condition to advance:
Time—30 minutes.

9. Caustic+Ammonia Displacement:

1 b.v. of displacement water is passed down flow through the bed at suitable flow rate of about 4 b.v. per hour to displace the caustic ammonia. The displaced solution is diverted in the effluent tank. (Refer "effluent processing")

Flow description:

Soft water from inlet (6) and isolation valve (8) is pumped (13) via flow control valve (22), and regenerant isolation valve (21) into the resin containment/processing vessel (25), distributed onto the resin bed via the regenerant chemical inlet distributors (26). Having passed down-flow through the process vessel, the spent solution is collected by the under bed strainer/distributor system (28) and diverted via effluent outlet valve (33) to the effluent tank (34).

Condition to advance:
Time—15 minutes.

10. First Fast rinse:

The bed is rinsed from the top of the vessel with 1 b.v. of water at about 12 b.v. per hour to rinse the majority of the free aqueous caustic ammonia solution from the resin. The rinse effluent from this step is diverted to the effluent tank.

Flow description:

Raw water from inlet (6) and isolation valve (8) pumped (13) via rinse inlet valve (24), into the resin containment/processing vessel (25), Having passed down-flow through the process vessel, the rinse solution is collected by the under bed strainer/distributor system (28) and diverted via effluent outlet valve (33) to the effluent tank (34).

Condition to advance:
Time—5 minutes.

11. Acid Wash:

Necessary to convert the functional groups on the resin from the free base form into the acid form to avoid the removal of fruit acid from the subsequent juice process cycle. Either citric or phosphoric acid may be used to effect the conversion. The effluent from this step is diverted to the effluent tank.

Additional acid is used to ensure that the ammonia in the effluent tank is neutralised and acidified to ensure that free ammonia is not liberated form the effluent solution when it is diverted to the effluent drain. Typically 2 b.v. of citric acid as a 2% w/v solution is adequate to ensure effluent neutralisation. The flow rate that the acid solution is applied at may be at typical fat rinse rate of up to 12 bed volumes per hour.

Flow description:

Acid from inlet (4) is pumped (12) via acid injection valve (19), and regenerant isolation valve (21) into the processing vessel (25), distributed onto the resin bed via the regenerant chemical inlet distributors (26). Having passed down-flow through the process vessel, the partially depleted solution is collected by the under bed strainer/distributor system (28) and diverted via effluent outlet valve (33) to the effluent tank (34).

Condition to advance:
Time—15 minutes.

12. Displacement:

Acid solution is displaced with 1 b.v. of raw potable water at a flow rate of 4 b.v. per hour. The effluent from this step is diverted to the effluent tank.

Flow description:

Water from inlet (5) and isolation valve (7) is pumped (13) via flow control valve (22), and regenerant isolation valve (21) into the processing vessel (25), distributed onto the resin bed via the regenerant chemical inlet distributors (26). Having passed down-flow through the resin containment/process vessel, the displaced acid solution is collected by the under bed strainer/distributor system (28) and diverted via effluent outlet valve (33) to the effluent tank (34).

Condition to advance:
Time—15 minutes.

13. Final Rinse:

Resin bed is rinsed with raw potable water at a suitable rate (approximately 12 b.v. per hour) to remove residues of acid. Completion of final rinse is sensed by the monitoring the conductance of the rinse water exiting the resin bed. Final rinse water is diverted to drain.

At the completion of the final rinse the resin bed may be returned to service for the next juice processing cycle to begin.

Flow Description:

Raw water from inlet (6) and isolation valve (8) is pumped (13) via rinse inlet valve (24), into the processing vessel (25), Having passed down-flow through the resin containment/process vessel, the rinse solution is collected by the under bed strainer/distributor system (28) and diverted via the rinse outlet valve (32) to the drain (41).

Condition to advance:

Reduced conductivity of rinse outlet indicates that the acid has been rinsed from the bed.

At the completion of the final rinse the resin bed may be returned to service for the next juice processing cycle to begin.

Concentration of juice to be processed can be in the range from ≈12° Brix (single strength) to 30° Brix. It is expected the increased viscosity and osmotic effects would limit the performance at concentrations above 30° Brix.

The temperature at which the process is conducted will effect the performance, however all development trials have been conducted at ambient temperature with commercially acceptable results. Increasing the temperature will improve the kinetics of the process (possibly without leakage of patulin) but the capacity of the resin will not be increased.

Effluent processing: Effluent from this process does contain ammonia.

Consideration has been given to minimising the egress of ammonia gas by collecting (bulking) the effluent which contains ammonia into a suitable tank.

The effluent from the acid wash step is added to the ammonia containing effluent at a rate to ensure that the pH is less than 7 thus preventing the evolution of ammonia gas. During the time the effluent is diverted to the effluent tank the tank is mixed with a suitable mixer. At the completion of the regeneration the contents of the tank is discharged to the common drain.

Trials with Alimentech P570 and P700 Resins:

A series of screening trials were used to identify the Adsorbent Polymers/Resins which displayed the highest capacities for patulin reduction from apple juice reconstituted from concentrate. It was immediately obvious that standard hydrophobic adsorbent polymers, (P420 (Alimentech), SP70 (Mitsubishi), XAD16 (Rohm & Haas), SP207 (Mitsubishi), etc.), used for decolourisation of juice displayed limited capacity for patulin, interpreted to be due to competition for the available adsorption sites by other larger components in the juice which are capable of multisite hydrophobic interactions. The highest capacity was displayed by Alimentech P570 and Alimentech P700. Both Adsorbent Resins are lightly functionalised with tertiary amine groups and thereby comply with FDA regulations. Both also have a preponderance of micropores eliminating the competition from the larger hydrophobic compounds in a juice which are size excluded from the large portion of the available adsorption surface. Evaluation of both of these adsorbent resins were progressed to laboratory scale column trials.

Juices of the Trials:

SAMPLE A.

Apple juice reconstituted to 25° Brix from concentrate. The partial concentrate was moderately coloured with a higher than typical total polyphenol content. During this series of trials the detected level of patulin in the juice decreased from 98 $\mu$g/l to 13 $\mu$g/l corrected to 12° Brix.

SAMPLE B.

25° Brix apple juice reconstituted from concentrate. This partial concentrate was lower in colour and total polyphenolics than the SAMPLE A juice. During these trials patulin was reduced from 78 $\mu$g/l to 12 $\mu$g/l corrected to 12° Brix.

Adsorbent Resins:

A. Alimentech P570, 100 ml in a ½" column giving ~600 mm bed depth. The resin sample had been cycled with apple juice twenty two times previously. The resin was stored layed-up in 2% caustic solution and hence was conditioned by cycling once with phosphoric acid before initiating a standard patulin regeneration followed by five monitored, sequential processing cycles using SAMPLE A high patulin juice, and finally by one cycle with SAMPLE B juice.

B. Alimentech P700, 100 ml in a ½" column, providing an ~600 mm b.v. depth. The adsorbent resin was preconditioned from new with eight cycles using apple partial concentrate prior to conducting five monitored, sequential processing cycles treating SAMPLE A high patulin juice, followed by one cycle using SAMPLE B juice.

Procedure:

The selected concentrate was reconstituted to 25° Brix and thirty bed volumes pumped through the bed at 6 b.v./hr, at ambient temperature. The performance of the resins are predicted to be diffusion rate dependent so flow rates are important. Five samples were drawn through each of the service cycles and analysed to determine the patulin and polyphenol leakage profiles. The results are displayed in FIGS. 9 to 12.

Tables 3 to 5 exhibit the typical feed juice analysis, plus the concentrations of indicative components in selected treated composite samples, after normalisation to 25° Brix. The results were selected to demonstrate performance trends, the other results are available upon request.

TABLE 3

Results: Analyses of the Patulin Reduced Composites of SAMPLE A apple juice partial concentrate treated through Alimentech P570.
Refer FIG. 9:

| Analyses | | Typical untreated feed | Process cycle 23 | Process cycle 26 | Process cycle 27 |
|---|---|---|---|---|---|
| Volume treated | bv | 30.0 | 30.3 | 30.5 | 30.6 |
| pH | | 3.6 | 3.7 | 3.7 | 3.7 |
| Soluble solids | ° Brix | 25.0 | 24.1 | 24.0 | 24.22 |
| Conductivity at 20° C. | μS/cm | 3190 | 3220 | 3190 | 3130 |
| $Abs_{325}$ of total polyphenolics[1] | AU | 0.945 | 0.822 (−13%) | 0.825 (−13%) | 0.829 (−12%) |
| Absorbance[1] | 420 nm | 1.200 | 1.195 (<−1%) | 1.192 (<−1%) | 1.186 (−1%) |
| 1 cm cell path | 560 nm | 0.154 | 0.154 (0%) | 0.153 (<−1%) | 0.157 (+2%) |
| Patulin[1] | μg/l | 210 | 14 (−93%) | 28 (−87%) | 27 (−87%) |
| Patulin converted to 12° Brix[2] | μg/l | 98 | 6 | 13 | 13 |

[1]The total polyphenolics, absorbance and patulin results have been normalised to 25° Brix for ease of comparison.
[2]The World Health Organisation guideline limit for patulin is 50 ppb, ~50 μg/l at 12° Brix.

TABLE 4

Figure 10:
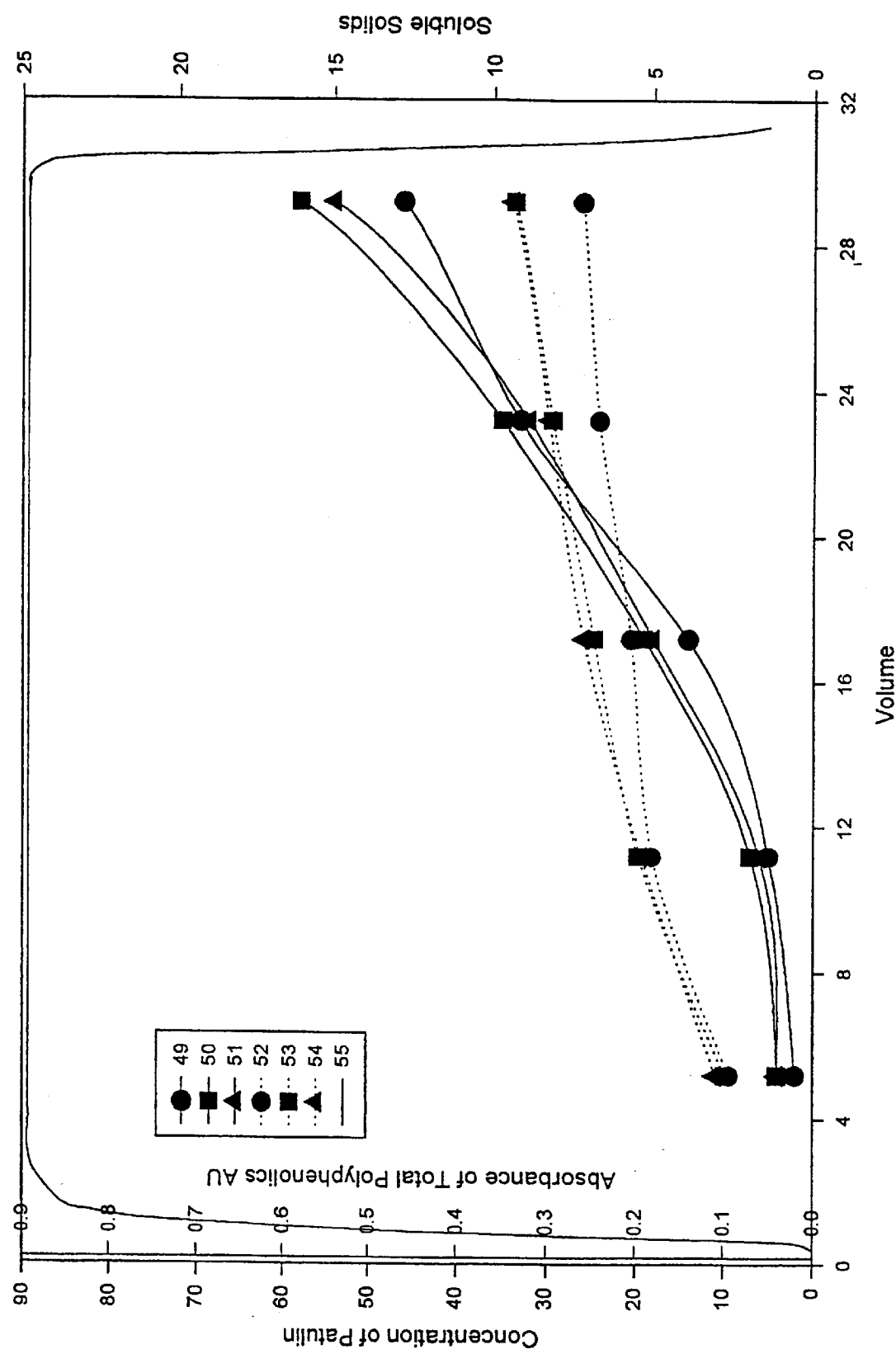
FIG. 10 is a similar plot to that of FIG. 9 but in respect of a similar partial concentrate (25° Brix) (SAMPLE A) using a different media (Alimentech P700) showing as against the media (Alimentech P570) of FIG. 9 (by plotting cycles 9, 12 and 13) the greater reduction in colour arising from the greater absorbance at 325 n.m of Total Polyphenolics of the juice.

Analyses of the Patulin Reduced Composites of Sample A apple juice partial concentrate treated through Alimentech P700
Refer FIG. 10:

| Analyses | | Typical untreated feed | Process cycle 9 | Process cycle 12 | Process cycle 13 |
|---|---|---|---|---|---|
| Volume treated | bv | 30.0 | 30.6 | 30.8 | 30.6 |
| pH | | 3.6 | 3.6 | 3.6 | 3.6 |
| Soluble solids | ° Brix | 25.0 | 23.9 | 24.0 | 23.8 |
| Conductivity at 20° C. | μS/cm | 3150 | 3110 | 3150 | 3120 |
| $Abs_{325}$ of total polyphenolics[1] | AU | 0.930 | 0.183 (−80%) | 0.246 (−74%) | 0.246 (−74%) |
| Absorbance[1] | 420 nm | 1.166 | 0.609 (−48%) | 0.655 (−44%) | 0.650 (−44%) |
| 1 cm cell path | 560 nm | 0.146 | 0.071 (−51%) | 0.078 (−47%) | 0.081 (−45%) |
| Patulin[1] | μg/l | 250 | 16 (−94%) | 22 (−91%) | 21 (−92%) |
| Patulin converted to 12° Brix[2] | μg/l | 114 | 7 | 10 | 10 |

[1]The total polyphenolics, absorbance and patulin results have been normalised to 25° Brix for ease of comparison.
[2]The World Health Organisation guideline limit for patulin is 50 ppb, ~50 μg/l at 12° Brix.

TABLE 5

Results continued:
Comparison of the analyses of the Patulin Reduced Composites for the Alimentech P570, or P700, treated SAMPLE B apple juice partial concentrate.

Figure 11:
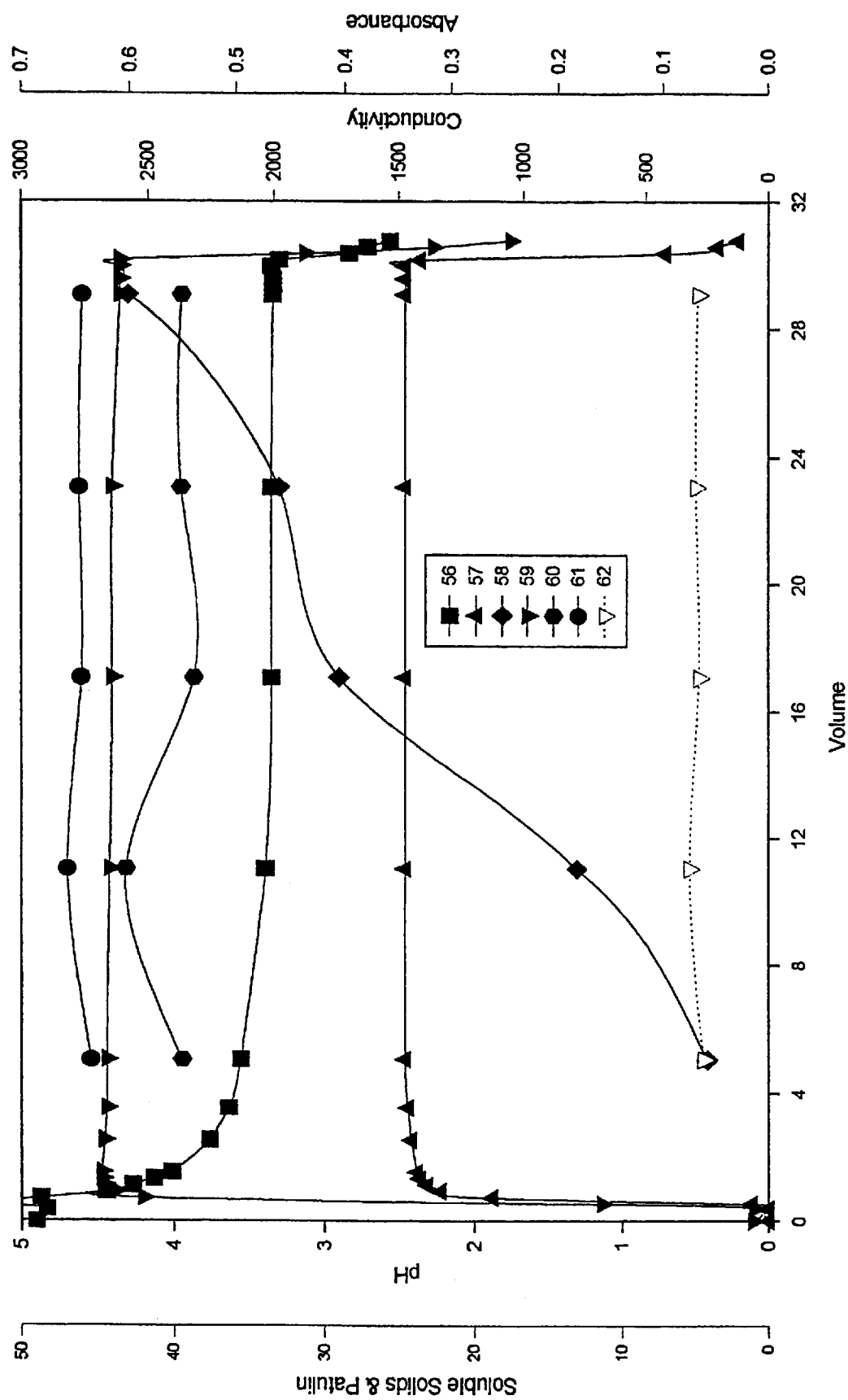
FIG. 11 shows for a different source of apple juice partial concentrate (25° Brix) (SAMPLE B) (again using the media of FIG. 9, ie; Alimentech P570) and for process cycle 28 the relationship of (i) pH to volume of apple juice processed, (ii) the conductivity with respect to volume to apple juice processed, (iii) titratable acid against volume of apple juice processed, (iv) absorbance of total polyphenolics and absorbents against volume of apple juice processed, and (v) ° Brix and patulin concentration against volume of apple juice processed.
Figure 12:
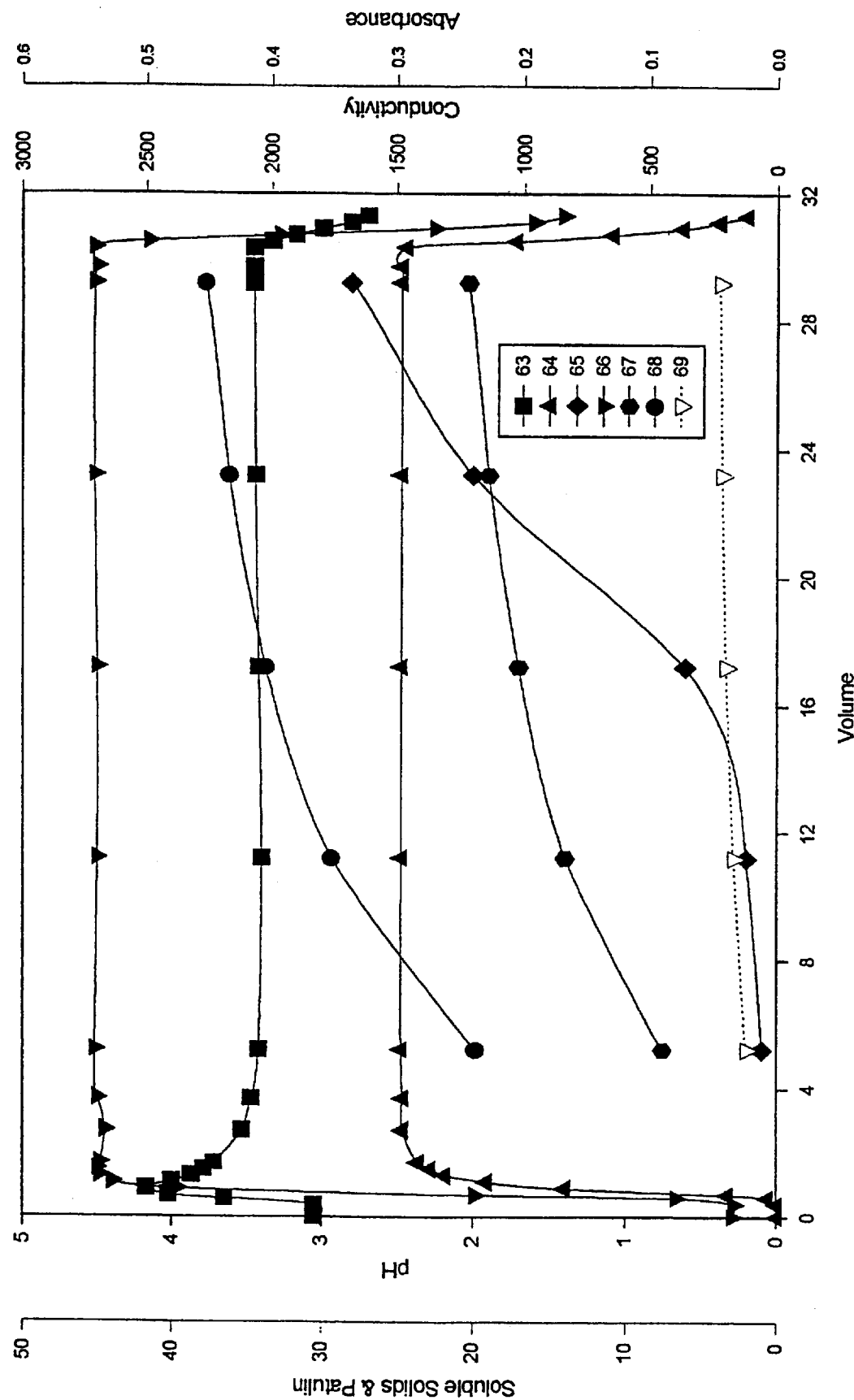
FIG. 12 is a similar plot to that of FIG. 11 (SAMPLE B also) but where Alimentech P700 has been used and in respect of an earlier process cycle (process cycle 14)
Figure 13:
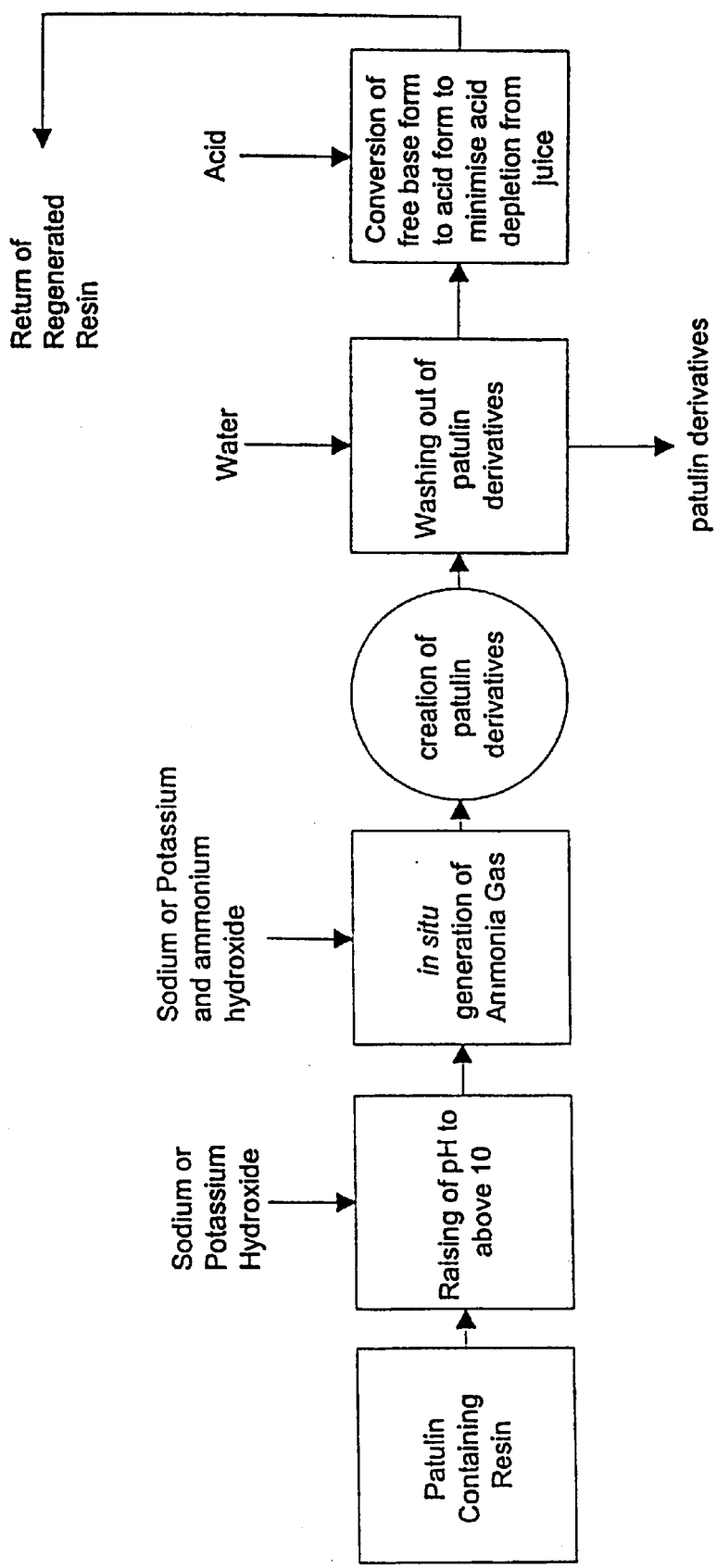
FIG. 13 is a flow diagram of the preferred resin regeneration process.

| Analyses | | Typical untreated Juice | Refer FIG. 11 P570 Process cycle 28 | Refer FIG. 12 P700 Process cycle 14 |
|---|---|---|---|---|
| Volume | bv | 30.0 | 30.2 | 30.6 |
| pH | | 3.5 | 3.6 | 3.5 |
| Soluble solids | ° Brix | 25.0 | 24.0 | 23.8 |
| Conductivity at 20° C. | μS/cm | 2900 | 2880 | 2900 |

TABLE 5-continued

Results continued:
Comparison of the analyses of the Patulin Reduced Composites for the Alimentech P570, or P700, treated SAMPLE B apple juice partial concentrate.

| Analyses | | Typical untreated Juice | Refer FIG. 11 P570 Process cycle 28 | | Refer FIG. 12 P700 Process cycle 14 | |
|---|---|---|---|---|---|---|
| $Abs_{325}$ of total polyphenolics[1] | AU | 0.630 | 0.599 | (−5%) | 0.206 | (−67%) |
| Absorbance[1] | 420 nm | 0.669 | 0.655 | (−2%) | 0.385 | (−42%) |
| 1 cm cell | 560 nm | 0.077 | 0.067 | (−13%) | 0.046 | (−40%) |
| Patulin[1] | μg/l | 170 | 26 | (−85%) | 13 | (−92%) |
| Patulin converted to 12° Brix[2] | μg/l | 78 | 12 | | 6 | |

[1]The total polyphenolics, absorbance and patulin results have been normalised to 25° Brix for ease of comparison.
[2]The World Health Organisation guideline limit for patulin is 50 ppb, ~50 μg/l at 12° Brix.

Figure 9:
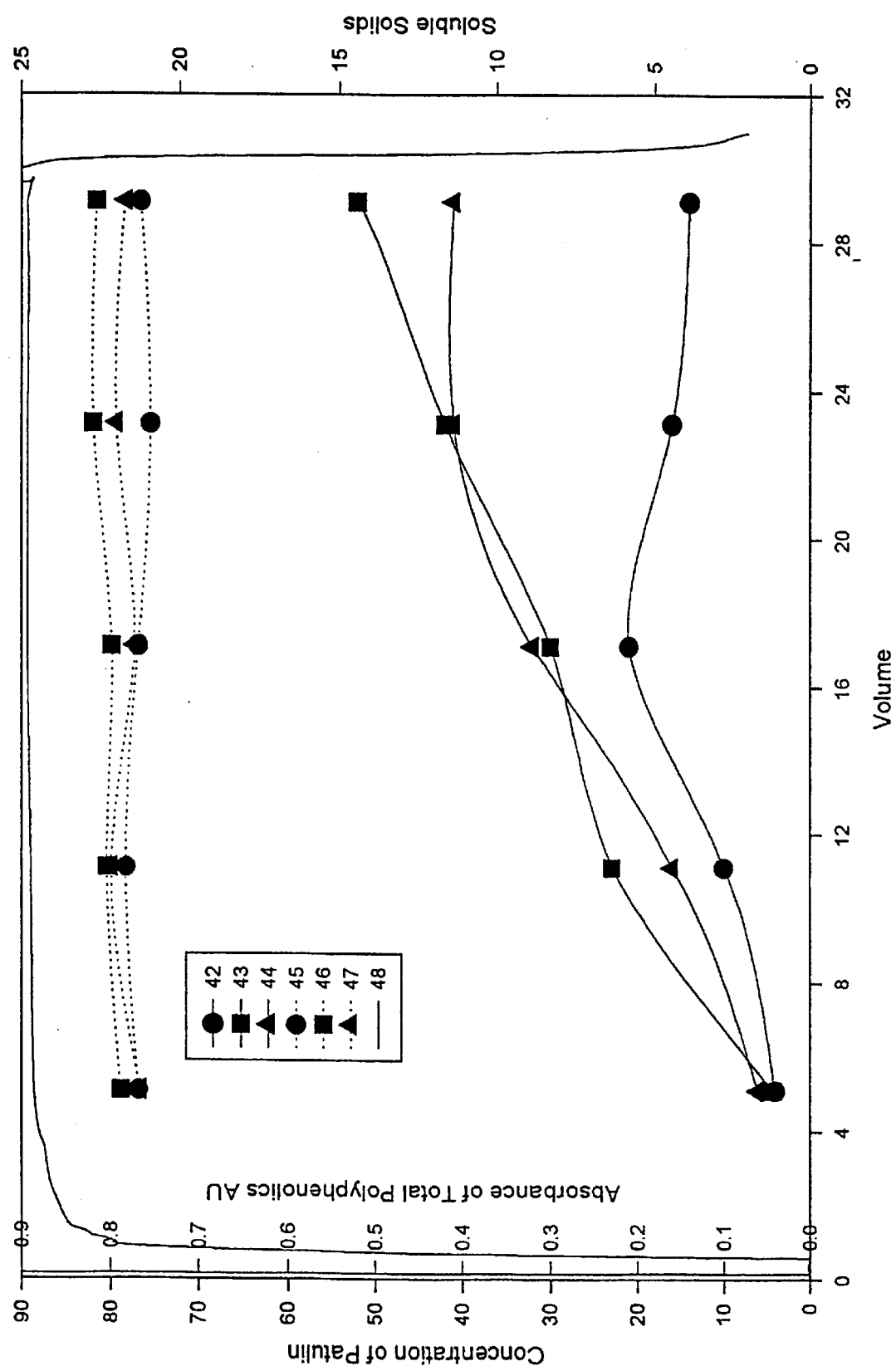
FIG. 9 is a complex plot in respect of trials using a partial apple juice concentrate (25° Brix) (SAMPLE A) and a preferred synthetic adsorbent resin media of the present invention (Alimentech P570) to demonstrate the regenerative nature of the media (for example, by plotting results for process cycles 23, 26 and 27—each cycle being one presentation of the media to the juice for the purpose of patulin removal and thereafter one regeneration), the plot showing (i) concentration of patulin ($\mu$g/l) against the volume of apple juice processed (BV), (ii) the absorbance at 325 nm of Total Polyphenolics against volume of apple juice processed (BV), and (iii) the relationship of ° Brix against bed volume.

FIG. 9 compares the patulin and total polyphenolic leakage profiles for selected process cycles through Alimentech P570, and FIG. 10 displays the analogous data for the process runs through Alimentech P700. In FIG. 9 the concentration of Patulin (μg/l) is plotted against Volume of 25° Brix Apple Juice Processed whilst Soluble Solids (° Brix) is also plotted against the same Volume axis. In the plot:

42 is Bed Volume vs Concentration of Patulin (μg/l) for Process Cycle 23, 43 is Bed Volume vs Concentration of Patulin (μg/l) for Process Cycle 26, 44 is Bed Volume vs Concentration of Patulin (μg/l) for Process Cycle 27, 45 is Bed Volume vs Absorbance of Total Polyphenolics (AU) for Process Cycle 23, 46 is Bed Volume vs Absorbance of Total Polyphenolics (AU) for Process Cycle 26, 47 is Bed Volume vs Absorbance of Total Polyphenolics (AU) for Process Cycle 27, and 48 is Bed Volume vs Soluble Solids (° Brix).

In FIG. 10 Concentration (μg/l) is plotted against V volume of 25° Brix Apple Juice processed. Also plotted are Soluble Solids (° Brix) against the same Volume axis. Also shown against the Volume axis is the Absorbance of Total Polyphenolics (AU).

In the plot of FIG. 10:

49 is Bed Volume vs Concentration of Patulin (μg/) for Process Cycle 9, 50 is Bed Volume vs Concentration of Patulin (μg/l) for Process Cycle 12, 51 is Bed Volume vs Concentration of Patulin (μg/l) for Process Cycle 13, 52 is Bed Volume vs Absorbance of Total Polyphenolics (AU) for Process Cycle 9, 53 is Bed Volume vs Absorbance of Total Polyphenolics (AU) for Process Cycle 12, 54 is Bed Volume vs Absorbance of Total Polyphenolics (AU) for Process Cycle 13, and 55 is Bed Volume vs Soluble Solids (° Brix).

FIGS. 11 and 12 focus upon the different leakage profiles for the juice characteristics monitored resulting from treatment by P570, and P700 respectively.

In FIG. 11 there is shown a plot of Soluble Solids (° Brix) and Patulin (μg/l) against Volume of 25° Brix Apple Juice Processed. Also plotted against the same Volume axis is pH. In addition, also against the same Volume axis is Conductivity (μS/cm). Still also plotted is the Absorbance of Total Polyphenolics (AU) and Absorbance and this is again against the same Volume axis. In the plot of FIG. 11:

56 is Bed Volume vs pH, 57 is Bed Volume vs ° Brix, 58 is Bed Volume vs Patulin (μg/l), 59 is Bed Volume vs Conductivity (μS/cm), 60 is Bed Volume vs Abs of Total Polyphenolics (AU), 61 is Bed Volume vs 'Colour' Absorbance at 420 nm, 62 is Bed Volume vs 'Colour' Absorbance at 560 nm.

FIG. 12 plots Soluble Solids (° Brix) and Patulin (μg/l) against Volume of 25° Brix Apple Juice Processed. As with FIG. 11 pH is also plotted against the same Volume axis. Also plotted is Conductivity (μS/cm) against the same Volume axis. Finally also plotted is Absorbance of Total Polyphenolics (AU) and Absorbance against the same Volume axis. In the plot:

63 is Bed Volume vs pH, 64 is Bed Volume vs ° Brix, 65 is Bed Volume vs Patulin (μg/l), 66 is Bed Volume vs Conductivity (μS/cm), 67 is Bed Volume vs Absorbance of Total Polyphenolics (AU), 68 is Bed Volume vs 'Colour' Absorbance at 420 nm, and 69 is Bed Volume vs 'Colour' Absorbance at 560 nm.

All of the plots of FIG. 12 are in respect of process cycle 14.

Note the use of Alimentech P700 has the effect of much greater colour reduction (ie; −42% at 420 nm as opposed to only −2% with Alimentech P570 for SAMPLE B).

Patulin Analysis:

The patulin analyses were conducted using Reversed-phase High Performance Liquid Chromatography using standard methods.

What we claim is:

1. A process for reducing the patulin content in a fruit juice which comprises or includes (i) presenting the juice to a resin material having in abundance micropores of less than 20 Å minimum pore width and at least a pore surface capable of retaining patulin by the forces of chemisorption, and (ii) harvesting the juice with a reduced patulin content from step (i).

2. A process of claim 1 wherein the resin has weak base functionality.

3. A process of claim 1 wherein said resin is substantially devoid of mesopores and macropores.

4. A process of claim 1 wherein the abundance of micropores is of a size capable of receiving patulin yet having a minimum pore width insufficiently large to allow alkaline solution conversion of pore retained patulin to a more easily flushed out form.

5. A process of claim 1 wherein said resin has micropores in abundance of less than 15 Å minimum pore width.

6. A process of claim 1 wherein said resin has in abundance pores of from 5 to 20 Å minimum pore width.

7. A process of claim 1 wherein said resin has very high internal surface areas yet a low mercury intrusion characteristic.

8. A process of claim 7 wherein said resin has a surface area of greater than 900 $m^2/g$ (BET).

9. A process of claim 8 wherein said surface area is from 1000 to 1500 $m^2/g$(BET).

10. A process of claim 7 wherein said resin has a mercury intrusion ($d_{50}$,A) of less than 100.

11. A process of claim 1 wherein said resin is in the form of bed of beads, granules or fibers.

12. A process of claim 11 wherein said beads, granules or fibres have a particle or transverse section of from 300 to 1600 microns across.

13. A process of claim 1 wherein said resin is a styrene divinyl benzene network copolymer resin.

14. A process of claim 13 wherein said resin has been hypercrosslinked whilst in the swollen state.

15. A process of claim 1 wherein the resin has been regenerated after a previous use in a similar patulin extraction process.

16. A process of claim 15 wherein said regeneration has involved the conversion of the resin held patulin to a more easily flushed out derivative using ammonia or a volatile base.

17. A process of claim 16 wherein said conversion has involved the at least substantially in situ generation or expression of ammonia or a volatile base from a high pH solution in contact with the resin.

18. A process of claim 17 wherein ammonia gas was expressed.

19. A process of claim 16 wherein said regeneration has subsequently involved, after flushing out of the patulin derivative(s), the presentation of an acid to the resin.

20. A process of claim 1 wherein the juice is presented to the resin in the range of 20 or greater bed volumes prior to regeneration of the resin, the bed volume range being expressed in proportion to a real or notional single juice strength.

21. A process of claim 1 wherein the juice is presented to the resin at a rate of from about 4 to about 10 bed volumes/hour.

22. A process of claim 1 wherein the resin has been tertiary amine functionalized but is presented to the juice in an acid form (as opposed to the free base form) thereby reducing the uptake of juice acid during the presentation of the juice to the resin.

23. A process of claim 1 wherein the resin provides a bed of depth of from 0.5 to 2.0 meters.

24. A method of regenerating a micropored resin which contains patulin in micropores which comprises or includes, in a high pH liquid environment containing the patulin fouled resin, generating ammonia gas or a volatile base sufficient to convert the micropore held patulin to a more easily flushed out derivative or derivatives and flushing the derivative(s) from the micropores.

25. A method of claim 24 wherein the high pH liquid environment is 10 or above.

26. A method of claim 24 wherein ammonia gas is generated.

27. A method of claim 24 wherein the resin after the flushing step is presented to an acid.

28. A method of claim 24 wherein the high pH liquid environment is provided by potassium hydroxide, sodium hydroxide or both.

29. A method of claim 24 wherein said acid is phosphoric acid, citric acid or both.

* * * * *